United States Patent [19]

Yukuta et al.

[11] 4,077,920

[45] Mar. 7, 1978

[54] FLAME- AND SMOKE-RESISTANT POLYURETHANE FOAM AND A METHOD FOR PRODUCING SAID FOAM

[75] Inventors: Toshio Yukuta, Kodaira; Takashi Ohashi, Iruma; Katsuhiko Arai, Kodaira, all of Japan

[73] Assignee: Bridgestone Tire Company Limited, Tokyo, Japan

[21] Appl. No.: 687,126

[22] Filed: May 17, 1976

[30] Foreign Application Priority Data

May 15, 1975 Japan .................................. 50-56692

[51] Int. Cl.$^2$ ........................ C08G 18/32; C08G 18/14
[52] U.S. Cl. ........................... 260/2.5 AM; 260/2.5 AJ
[58] Field of Search ................. 260/2.5 AM, 2.5 AC, 260/2.5 AJ, 77.5 SP

[56]     References Cited
       U.S. PATENT DOCUMENTS

| | | | |
|---|---|---|---|
| 3,425,964 | 2/1969 | Stanley | 260/77.5 SP |
| 3,461,101 | 8/1969 | Oertel | 260/77.5 SP |
| 3,461,102 | 8/1969 | Oertel | 260/77.5 SP |
| 3,499,876 | 3/1970 | Thoma | 260/77.5 SP |
| 3,635,908 | 1/1972 | Vogt | 260/2.5 AM |
| 3,925,266 | 12/1975 | Fabris | 260/2.5 AM |
| 3,926,867 | 12/1975 | Quock | 260/2.5 AM |
| 3,929,730 | 12/1975 | Graefe | 260/2.5 AM |
| 3,977,989 | 8/1976 | Taub | 260/2.5 AM |

FOREIGN PATENT DOCUMENTS

| | | | |
|---|---|---|---|
| 4,713,068 | 4/1972 | Japan | 260/2.5 AC |

*Primary Examiner*—C. Warren Ivy
*Attorney, Agent, or Firm*—Sughrue, Rothwell, Mion, Zinn and Macpeak

[57]           ABSTRACT

An excellent flame- and smoke-resistant polyurethane foam is produced by reacting a polyol, a polyisocyanate and an amine-carbamate of primary or secondary amine having hydroxyl group in the presence of a catalyst and a surfactant.

31 Claims, No Drawings

4,077,920

FLAME- AND SMOKE-RESISTANT POLYURETHANE FOAM AND A METHOD FOR PRODUCING SAID FOAM

BACKGROUND OF THE INVENTION

1. Field of the Invention:

The present invention relates to a flame- and smoke-resistant polyurethane foam and a method for producing said polyurethane foam.

2. Description of the Prior Art:

It is well known to produce polyurethane foams by a combination of a polyol, a polyisocyanate, water and/or other blowing agent, a catalyst and a surfactant. A variety of foams, such as flexible, semi-rigid and rigid polyurethane foams, can be obtained depending upon the number of functional groups, molecular weight and skeleton structure of the components to be used. These polyurethane foams are widely used as sheet and cushioning materials for furnitures, vehicles, aircrafts and ships and as a material for cloths and buildings. Although polyurethane foams are used in various fields due to the characteristic property, the foams have a serious drawback in the inflammability. In order that the polyurethane foams are fully suitable for these uses, the use of polyurethane foams having flame resistance has recently been demanded. Moreover, the legal regulation of the use of flame-resistant polyurethane foams becomes more strictly year after year, and this tendency is noticeable in the polyurethane foams for motorcars, railway vehicles and aircrafts.

Heretofore, various attempts have been made with respect to the method for providing the flame resistance to polyurethane foams. However, although conventional methods, that is, the use of addition type flame retardants, such as phosphorus-containing compound, halogen- and phosphorus-containing compound, antimony oxide and other metal oxides, or the use of reaction type flame retardants can provide a certain degree of flame resistance for the polyurethane foams, but the polyurethane foams, which have been judged as non-burn by the burning test (ASTM-D-1692-59T), are few. Moreover, in these processes, a relatively large amount of the flame retardant is required, and therefore these processes are not preferable in view of economy. Further, the addition type flame retardants decrease in the effect with the lapse of time and further act as a plasticizer, and therefore, the use of the addition type flame retardant has an adverse influence upon the general physical properties of the resulting foam. While, the use of the reaction type flame retardant affects adversely the foaming stability and general physical properties of the resulting foam and causes scorch and other unfavorable phenomena during the production of the foam, and therefore, it is difficult to use a large amount of the reaction type flame retardant, and the effect of the use thereof is low. Moreover, the flame-resistant foam obtained by the use of these flame retardants is apt to be larger in the emission of smoke upon burning than the polyurethane foam containing no flame retardant, and threre is a serious problem in the use of flame-resistant foam containing these flame retardants in view of the smoke emission. Namely, in the conventional process, it has been difficult to provide both the properties of high flame resistance and smoke resistance for polyurethane foam.

SUMMARY OF THE INVENTION

It is, therefore, an object of the present invention to provide a flame- and smoke-resistant polyurethane foam and a method for producing said polyurethane foam.

That is, one of the aspect of the present invention is to provide a flame- and smoke-resistant polyurethane foam obtained by reacting a polyol, a polyisocyanate and an amine-carbamate of primary or secondary amine having hydroxyl group in the presence of a catalyst and a surfactant.

Another aspect of the present invention is to provide a method for producing flame- and smoke-resistant polyurethane foams, which comprises dissolving a primary or secondary amine having hydroxyl group in a polyol, blowing carbon dioxide gas into the solution to form an amine-carbamate, and reacting the resulting mixture of the polyol and the amine-carbamate with a polyisocyanate in the presence of a catalyst and a surfactant.

It has been known to use amine-carbamate in the production of polyurethane foam. However, conventional techniques using amine-carbamate cannot provide flame- and smoke-resistant polyurethane foam. It is important to use an amine having hydroxyl group as the amine component of the amine-carbamate to be used as one component of polyurethane foam in order to attain object of the present invention.

According to the present invention, an excellent flame- and smoke-resistant polyurethane foam having excellent general physical properties can be obtained without the use of a flame retardant.

According to the present invention, a foaming reaction can be carried out without the use of water or other organic solvent having a low boiling point as a blowing agent.

According to the present invention, the foaming reaction can be carried out without the use of an amine as a catalyst.

According to the present invention, the foaming reaction can be proceeded uniformly, and a good polyurethane foam can be obtained.

The polyurethane foam obtained in the present invention can be widely used as an industrial material depending upon the density and hardness of the foams. For example, the foam can be used as a raw material for the production of slab blocks for cushioning materials, shock absorbers, furnitures and heat insulators for pipe, and further the foam can be formed into a laminate or formed by the spray-foaming so as to use the foam as a heat-insulating wall, or the foam can be produced in the form of various foamed-in-mold articles.

DESCRIPTION OF THE PREFERRED EMBODIMENTS

As the polyol to be used in the present invention, there may be used polyether polyols having terminal hydroxyl group, polyester polyols having terminal hydroxyl group and polyetherester polyols having terminal hydroxyl group, which are copolymers of ether and ester. These polyols can be freely selected depending upon the property of the aimed polyurethane foam. As the polyether polyol, there may be used poly(oxyalkylene) polyols obtained by the addition polymerization of alkylene oxides, such as ethylene oxide, propylene oxide and the like, to polyhydroxyl compounds, such as propylene glycol, glycerine, trimethyolpropane, 1,2,6-hexane triol, pentaerythritol, sorbitol, saccharose and the like. Further, as the polyether polyol, there may be used poly(oxyalkylene) polyols obtained by the addition polymerization of two or more of these alkylene oxides to the polyhydroxyl compound, in which the monomer units derived from the alkylene oxides are bonded randomly or in block state. As the polyester polyol, there may be used polyester polyols obtained by the polycondensation reaction of polybasic acids, such as adipic acid, succinic acid, maleic acid, phthalic acid and the like, with polyhydroxyl compounds, such as ethylene glycol, propylene glycol, butylene glycol and the like, or by the ring opening polymerization of lactones. As the polyetherester polyol, there may be used polyetherester polyols obtained by the polycondensation reaction of the above described polybasic acids with polyhydroxyl compounds having ether bond, such as diethylene glycol, triethylene glycol and the like.

In the present invention, polyols having a number average molecular weight of 200-6,000 and a hydroxyl value of 20-900 mgKOH/g are generally used. The number average molecular weight and hydroxyl value of the polyol should be varied whether the aimed polyurethane foam is flexible, semi-rigid or rigid. In the production of flexible or semi-rigid polyurethane foam, polyols having a number average molecular weight of 1,000-6,000 and a hydroxyl value of about 20-170 mgKOH/g are used alone or in admixture. In the production of rigid polyurethane foam, polyols having a number average molecular weight of 200-1,000 and a hydroxyl value of about 150-900 mgKOH/g are used alone or in admixture. Of course, these polyols can be freely combined and used. For example, polyurethane foams having a high flexibility can be obtained by combining a polyether polyol or a polyester polyol, which has a hdyroxyl value of 20-170 mgKOH/g, with a polyether polyol or a polyester polyol, which has a hydroxyl value of 150-900 mgKOH/g.

In the present invention, polyether polyols are preferably used as the polyol. Among polyether polyols, poly(oxyalkylene) polyol, particularly, poly(oxypropylene) triol having a number average molecular weight of 1,000-3,000, which is obtained by the addition polymerization of propylene oxide to glycerine and is generally used in the production of commonly used flexible or semi-rigid polyurethane foam, is preferably used. If desired, the polyol may be used in admixture with low molecular weight polyhydroxyl compounds having a number average molecular weight of 60-300, such as ethylene glycol, propylene glycol, diethylene glycol, butane diol, glycerine, trimethylolpropane, trimethylolethane, triethylolpropane, triethylolethane, pentaerythritol, 1,2,6-hexane triol, triethanolamine, N,N,N',N'-tetrakis(2-hydroxypropyl)ethylenediamine and the like, as a crosslinking agent. When a mixture of these low molecular weight polyhydroxyl compounds with the polyol is used, the polyhydroxyl compounds are preferably used in an amount of not more than 20 parts by weight based on 100 parts by weight of the polyol. The reason is that the use of more than 20 parts by weight of the low molecular weight hydroxyl compound cannot produce good polyurethane foam and is apt to cause noticeable shrinkage in the foam.

As the polyisocyanate to be used in the present invention, there may be generally used tolylene diisocyanate. Particularly, tolylene diisocyanate, wherein 2,4- and 2,6-isomers of isocyanate group are mixed in a mixing ratio of 80/20 or 65/35 (weight ratio), is preferable in view of a low cost and utility. Crude tolylene diisocyanate may be used. As the other polyisocyanates, there may be used pure or crude diphenylmethane diisocyanate, diphenyl diisocyanate, chlorophenyl-2,4-diisocyanate, p-phenylene diisocyanate, xylylene diisocyanate, polymethylene-polyphenyl isocyanate and the like, or mixtures of these polyisocyanates and tolylene diisocyanate.

The amount of polyisocyanate used based on the total amount of the polyol and the other compound having active hydrogen, that is, the isocyanate index (NCO index) is in the range of 70-130, but when considering the balance of the flame resistance and the smoke resistance to the general physical properties of the produced polyurethane foam, the isocyanate index is preferred to be in the range of 80-110.

An amine-carbamate of primary or secondary amine having hydroxyl group to be used in the present invention can be obtained by reacting the amine with carbon dioxide gas. In general, pure amine-carbamate can be obtained by blowing carbon dioxide gas generated from a carbon dioxide bomb or from dry ice into a solution of an amine in alcohol, which is an inert solvent for the amine, filtering the separated and deposited white crystal, and drying the crystal. However, in the present invention, a master batch process, wherein carbon dioxide gas is blown, at room temperature under stirring, into a previously prepared solution of an amine in a polyol to be used in the production of polyurethane foam, is advantageously adopted. The reason is that amine-carbamates of amine having hydroxyl group are generally hygroscopic, and an amine-carbamate which is separately synthesized, isolated and purified, is difficultly storaged in a finely powdery state and is liably formed into block at the mixing with a polyol due to its insufficient dispersion in the polyol. Typical primary or secondary amines having hydroxyl group to be used in the present invention are amino-alcohols, such as monoethanolamine, monoisopropanolamine, mono-n-propanolamine, mono-n-butanolamine, diethanolamine, diisopropanolamine, di-n-propanolamine and the like. Further, in the present invention, as the primary or secondary amine having hydroxyl group, there may be used diamines having alcoholic hydroxyl group, which are obtained by the addition polymerization of alkylene oxide with aliphatic, alicyclic or aromatic diamines, such as N-(β-hydroxyethyl)ethylenediamine, N-(β-hydroxyethyl)propylenediamine, N-(β-hydroxyethyl)hexanediamine, N-(β-hydroxypropyl)hexanediamine, N-(β-hydroxybutyl)ethylenediamine, N-(β-hydroxybutyl)hexanediamine, N-(β-hydroxyethyl)xylylenediamine, N-(β-hydroxyethyl)cyclohexyldiamine, N,N'-bis(β-hydroxyethyl)ethylenediamine, N,N'-bis(β-hydroxyethyl)propylenediamine, N,N'-(β-hydroxyethyl)hxanediamine and the like; and aliphatic diamines having hydroxyl group in the side chain, such as 1,3-diaminopropanol-2, 1,6-diaminohexanol-2 and the like. Among the above described amines, amino-alcohols, such as monoethanolamine, monoisopropanolamine, mono-n-propanolamine, mono-n-butanolamine, diethanolamine, diisopropanolamine, di-n-propanolamine and the like, are particularly preferable.

The amine-carbamates of the above described amines can be used alone or in admixture. The amount of the amine-carbamate used is 3-40 parts by weight, preferably 5-30 parts by weight, based on 100 parts by weight of the polyol used in the production of polyurethane foam. When the amount exceeds 40 parts by weight, good foam cannot be obtained.

In the present invention, the above described amine-carbamate having hydroxyl group can be used together with amine-carbamates of aliphatic diamines having no hydroxyl group, such as ethylenediamine, propylenediamine, tetramethylenediamine, pentamethylenediamine, hexamethylenediamine, N-methylpropylenediamine and the like, if desired.

In general, the amine-carbamate of amine containing no active functional group, such as hydroxyl group or the like, is stable and does not react with isocyanate compound when they are merely mixed with each other. The reason is that amino group having a highest reactivity with isocyanate group is formed into carbamate, whereby the amino group is protected and is made difficultly reactive with isocyanate group. The reaction of amine-carbamate with isocyanate group is started by the amino group regenerated under the decomposition condition of the amine-carbamate, and therefore the reaction can be suppressed. On the contrary, the amine-carbamate of amine having hydroxyl group to be used in the present invention is decomposed by the reaction heat due to the reaction of the hydroxyl group with isocyanate group and further has a low decomposition temperature, and therefore the reaction of the amine-carbamate with polyisocyanate group proceeds continuously and smoothly, and foaming and curing reactions are carried out continuously and smoothly to form a good foam.

As the catalyst to be used in the present invention, there can be used commonly used catalysts in the art. The catalysts include organometallic compounds, such as stannous octoate, dibutyltin dilaurate and the like; and amines, such as triethylenediamine, triethylamine, N-methylmorpholine, N-ethylmorpholin, tetramethylbutanediamine, pentamethyldiethylenetriamine, N,N-dimethylethanolamine, bis-($\beta$-dimethylaminoethyl) ether and the like. In the present invention, polyurethane foam can be produced without the use of the amine catalyst. The above described catalysts can be used alone or in admixture. The amount of catalyst to be used in the present invention is not particularly limited and can be varied in a wide range. However the catalyst is generally used in an amount of 0.001–5.0 parts by weight, preferably 0.01–2.0 parts by weight, based on 100 parts by weight of the polyol to be used in the production of polyurethane foam. Of course, more than 5 parts by weight of the catalyst can be used, but the use of such large amount is not economic.

The surfactant to be used in the present invention is commonly known silicone surfactant, and is selected from, for example, polydialkylsiloxanes and polysiloxane-polyalkylene oxide block copolymers. The kind and use amount of the silicone surfactant are not limited as far as the object of the present invention is attained, but polydimethyl-siloxane is advantageously used alone or in admixture. The use amount of the silicone surfactant is 0.005–3.0 parts by weight, preferably 0.05–2.0 parts by weight, based on 100 parts by weight of the polyol. Further, non-silicone surfactants also can be used as a surfactant. The non-silicone surfactants are compounds generally known as an emulsifier, and include sodium ricinoleicsulfonate; sodium salt of fatty acid; amine salts of fatty acid, for example, oleic acid diethylamine and stearic acid diethanolamine; alkali metal salts or ammonium salts of sulfonic acids, such as dodecabenzenesulfonic acid and dinaphthylmethane disulfonic acid, fatty acid, such as ricinoleic acid, and polymeric fatty acid; and the like.

In the present invention, a blowing agent which serves to control the density of the resulting polyurethane foam, may be used. The blowing agent is water or a volatile liquid having a low boiling point. The volatile liquid having a low boiling point includes, for example, methylene chloride, chloroform, monofluorotrichloromethane, monochlorodifluoromethane, dichlorodifluoromethane and the like. These blowing agents may be used alone or in admixture. When water is used as a blowing agent, it is preferred to use water in an amount of not more than 3.0 parts by weight based on 100 parts by weight of the polyol in order to give flame resistance to the resulting polyurethane foam. When it is desired to give a higher flame resistance to the polyurethane foam, commonly known flame retardant can be added. Further, in the present invention, a pigment, a filler and the like may be added as far as the object of the present invention is attained.

The production of the polyurethane foams according to the present invention can be carried out by the usually conducted process. For example, one shot process, wherein the polyisocyanate is added to a homogeneous mixture of the polyol, the catalyst, the surfactant, the amine-carbamate and other assistants to cause reaction and foaming, and so-called prepolymer process, wherein a part or the total amount of the polyol is previously reacted with the total amount of the polyisocyanate to form a prepolymer and then the prepolymer is mixed with the other components to cause foaming, are usually adopted.

According to the present invention, flame- and smoke-resistant polyurethane foams having excellent general physical properties can be obtained without the use of blowing agent and flame retardant used in conventional methods.

The polyurethane foams obtained in the present invention have a density of 0.020–0.100 g/cm$^3$. If desired, the density of the foams is further controlled by adding water, the other blowing agent or a low molecular weight polyhydroxyl compound or by selecting the kind of the polyol or the polyisocyanate, whereby flexible and semi-rigid polyurethane foams can be produced without departing from the object of the present invention.

The following examples are given for the purpose of illustration of this invention and are not intended as limitations thereof. In the examples, "parts" mean by weight unless otherwise indicated.

In the examples, the general physical properties were measured according to JIS K6301 and K6401. The burning test was carried out according to ASTM D-1692-59T. The smoke emmission test was carried out in the following manner. One g of a sample foam is burnt in an electrical furnace having an inner diameter of 100 mm and a depth of 250 mm by means of an electrical heating wire of 3 KW while flowing air at a rate of 2.0 l/min, and the generated smoke is gathered in a box of 50×50×50 cm. A maximum value of the extinction coefficient per unit weight of the sample is measured by means of a photoelectric detector, and expressed by smoke generation coefficient $C_{Smax}(m^{-1})$. The smoke resistance of a foam was judged by the smoke generation coefficient. The smaller is the coefficient, the higher the smoke resistance is.

EXAMPLE 1

Into a homogeneous solution of 12.7 part of diethanolamine and 100 parts of poly(oxypropylene) triol having a number average molecular weight of about 1,000 and a hydroxyl value of 158 (trademark Actcol 32-160, made by Takeda Chemical Industries, Ltd.) as a polyol was blown an excess amount of carbon dioxide gas at room temperature to prepare a white gruel-like mixture of 15.4 parts of diethanolamine carbamate and 100 parts of the polyol. Into a stainless steel beaker of 1 l capacity was charged 577 g of the mixture and fully stirred together with 1.5 g of stannous octoate and 0.25 g of a silicone surfactant (trademark: SH-200, made by Toray Silicone Co., viscosity: 50 cs) for about 30 seconds by means of a propeller stirrer. When the resulting homogeneous mixture was stirred at a high speed together with 234.9 g (NCO index: 103) of tolylene diisocyanate TDI-80 (2,4-isomer/2,6-isomer=80/20), a reaction began to start, and the reaction mixture became creamy in about 11 seconds (cream time). When the creamy mixture was immediately poured into a paper mold, the creamy mixture began to foam, and after 30 seconds (rise time), healthy bubbles were generated and the rising of foam was completed.

The properties of the resulting polyurethane foam are shown in the following Table 1.

Table 1

| Physical properties | Example I |
|---|---|
| Density (g/cm$^3$) | 0.0774 |
| Tensile strength (g/cm$^2$) | 1,098 |
| Elongation (%) | 80 |
| Tear strength (g/cm) | 601 |
| Number of cells/25 mm | 45 |
| 25% ILD (kg/200 mm$\phi$) | 37.2 |
| 65% ILD (kg/200 mm$\phi$) | 95.8 |
| Compression set (%) (50% deflection, 70° C×22 hrs) | 5.88 |
| Resilience (%) | 9 |
| Burning test | |
| Judged | self-extinguishing |
| Burning rate (mm/min) | 29 |
| Burning extent (mm) | 30 |
| Smoke test | |
| Smoke coefficient $C_{Smax}$ (m$^{-1}$) | 0.57 |

The semi-rigid polyurethane foam obtained in this Example 1 is a flame- and smoke-resistant foam having such peculiar physical prperties that the foam is low in the resilience and is excellent in the shock absorbing property.

While, a commercially available general purpose polyurethane foam showed a $C_{Smax}$ of 0.87 cm$^{-1}$ and a general purpose flame-resistant polyurethane foam containing 25 parts of tris-(2,3-dichloropropyl) phosphate as a flame retardant showed a $C_{Smax}$ of 1.03 cm$^{-1}$ in the smoke emission test. Therefore, the polyurethane foam obtained in this Example 1 is remarkably higher in the smoke resistance than the above described conventional polyurethane foams.

Further, when diethanolamine was directly used without forming into carbamate, the resulting foam shrank noticeably and a good foam was not obtained.

EXAMPLE 2

The procedure of Example 1 was repeated, except that 50 g of trichloromonofluromethane was added as a blowing agent and the amount of the silicone surfactant was increased to 1.0 g. After a cream time of 17 seconds and a rise time of 58 seconds, healthy bubbles were generated and a flexible polyurethane foam having a uniform cell structure was obtained. The properties of the resulting foam are shown in the following Table 2.

Table 2

| Physical properties | Example 2 |
|---|---|
| Density (g/cm$^3$) | 0.0430 |
| Tensile strength (g/cm$^2$) | 578 |
| Elongation (%) | 110 |
| Tear strength (g/cm) | 450 |
| Number of cells/25 mm | 40 |
| 25% ILD (kg/200 mm$\phi$) | 12.2 |
| 65% ILD (kg/200 mm$\phi$) | 29.1 |
| Compression set (%) (50% deflection, 70° C×22 hrs) | 18.4* |
| Compression set (%) (75% deflection, 25° C×96 hrs) | 22.6** |
| Resilience (%) | 6 |
| Burning test | |
| Judged | non-burn |
| Smoke test | |
| Smoke coefficient $C_{Smax}$ (m$^{-1}$) | 0.69 |

*The value was decreased to 7.5% by heating the foam at about 40° C.
**The value was decreased to 3.8% when the set plate was removed and the foam was left to stand for 20 hours.

EXAMPLE 3

The procedure of Example 2 was repeated, except that 2.0 g of stannous octoate and 228.5 g (NCO index: 100) of the tolylene diisocyanate were used. After a cream time of 15 seconds and a rise time of 33 seconds, healthy bubbles were generated, and a flexible polyurethane foam having a uniform cell structure was obtained. The properties of the resulting foam are shown in the following Table 3.

Table 3

| Physical properties | Example 3 |
|---|---|
| Density (g/cm$^3$) | 0.0413 |
| Tensile strength (g/cm$^2$) | 621 |
| Elongation (%) | 130 |
| Tear strength (g/cm) | 439 |
| Number of cells/25 mm | 48 |
| 25% ILD (kg/200 mm$\phi$) | 11.6 |
| 65% ILD (kg/200 mm$\phi$) | 29.0 |
| Compression set (%) (50% deflection, 70° C×22 hrs) | 14.2 |
| Resilience (%) | 6 |
| Burning test | |
| Judged | non-burn |
| Smoke test | |
| Smoke coefficient $C_{Smax}$ (m$^{-1}$) | 0.63 |

EXAMPLE 4

White powdery diethanolamine carbamate prepared separately by blowing carbon dioxide gas into a solution of diethanolamine in benzene was used, and a polyurethane foam was produced in the same compounding recipe and under the same condition as described in Example 3. After a cream time of 13 seconds and a rise time of 38.5 seconds, healthy bubbles were generated, and a good polyurethane foam was obtained. The properties of the resulting foam are shown in the following Table 4.

Table 4

| Physical properties | Example 4 |
|---|---|
| Density (g/cm$^3$) | 0.0444 |
| Tensile strength (g/cm$^2$) | 505 |
| Elongation (%) | 130 |

Table 4-continued

| | Example 4 |
|---|---|
| Tear strength (g/cm) | 418 |
| Number of cells/25 mm | 60 |
| 25% ILD (kg/200 mm$\phi$) | 8.4 |
| 65% ILD (kg/200 mm$\phi$) | 24.8 |
| Compression set (%) (50% deflection, 70° C×22 hrs) | 37.1 |
| Compression set (%) (75% deflection, 25° C×96 hs) | 56.2* |
| Resilience (%) | 6 |
| Burning test | |
| Judged | non-burn |
| Smoke test | |
| Smoke coefficient $C_{Smax}$ (m$^{-1}$) | 0.67 |

*This value was decreased to 5.1% when the set plate was removed and the foam was left to stand for 20 hours.

EXAMPLE 5

The procedure of Example 2 was repeated, except that 1.5 g of silicone surfactant L-520 (made by Union Carbide Corp.) was used and the amount of stannous octoate was increased to 2.0 g. After a cream time of 14 seconds and a rise time of 32 seconds, healthy bubbles were generated, and a polyurethane foam having fine cells was obtained. The properties of the resulting foam are shown in the following Table 5.

Table 5

| | Example 5 |
|---|---|
| Physical properties | |
| Density (g/cm$^3$) | 0.0436 |
| Tensile strength(g/cm$^2$) | 599 |
| Elongation (%) | 95 |
| Tear strength (g/cm) | 324 |
| Number of cells/25 mm | 85 |
| 25% ILD (kg/200 mm$\phi$) | 12.5 |
| 65% ILD (kg/200 mm$\phi$) | 33.5 |
| Compression set (%) (50% deflection, 70° C×22 hrs) | 29.1 |
| Resilience (%) | 8 |
| Burning test | |
| Judged | self-extinguishing |

Table 5-continued

| | Example 5 |
|---|---|
| Burning rate (mm/min) | 49 |
| Burning extent (mm) | 28 |
| Smoke test | |
| Smoke coefficient $C_{Smax}$ (m$^{-1}$) | 0.60 |

EXAMPLE 6

The procedure of Example 1 was repeated, except that 585 g of a mixture of 17.0 parts of diisopropanolamine carbamate and 100 parts of Actcol 32-160 was used and the amount of stannous octoate was increased to 2.0 g. After a cream time of 6 seconds and a rise time of 21 seconds, healthy bubbles were generated, and a polyurethane foam having a uniform cell structure was obtained. The resulting foam had a density of 0.0714 g/cm$^3$. In this compounding recipe, the foaming and curing reactions proceeded rapidly, and therefore this compounding recipe provides a foaming material suitable for spray-foaming. The burning test of the resulting foam showed that the foam was non-burn, and the smoke emission test showed that the foam had a smoke generation coefficient $C_{Smax}$ of 0.59 m$^{-1}$.

EXAMPLES 7–11

A mixture of 15.4 parts of diethanolamine carbamate and 100 parts of poly(oxypropylene) triol having a number average molecular weight of about 3,000 and a hydroxyl value of 55 (trademark GP-3000, made by Sanyo Kasei Co.) was produced in the same manner as described in Example 1. Polyurethane foams were produced by the use of the mixture or by the use of a blend of the mixture with a low molecular weight polyol according to the compounding recipe shown in the following Table 6 in the same manner as described in Example 1. The flammability, smoke emission and physical properties of the resulting foams are shown in Table 6 together with the compounding recipe and the foaming behavior in the foaming and curing reactions.

Table 6

| | Example 7 | Example 8 | Example 9 | Example 10 | Example 11 |
|---|---|---|---|---|---|
| Compounding recipe (g) | | | | | |
| GP-3000 | 500 | 500 | 500 | 500 | 500 |
| Diethanolamine carbamate | 77 | 77 | 77 | 77 | 77 |
| G-300* | | 77 | | | |
| T-400** | | | 77 | | |
| SC-800*** | | | | 77 | |
| EDP-450**** | | | | | 77 |
| Stannous octoate | 2.5 | | | 2.5 | 1.65 |
| Dibutyltin dilaurate | | 2.5 | 2.5 | | |
| Silicone surfactant (L-520) | 0.65 | 1.0 | 1.0 | 2.0 | 0.65 |
| TDI-80 | 267.0 | 303.8 | 285.8 | 311.3 | 303.0 |
| (NCO index) | 90 | 100 | 100 | 100 | 100 |
| Foaming behavior | | | | | |
| Cream time (seconds) | 13 | 17 | 16 | 18 | 6 |
| Rise time (seconds) | 45 | 52 | 46 | 42 | 35 |
| Burning test | | | | | |
| Judged | non-burn | self-extinguishing | self-extinguishing | self-extinguishing | self-extinguishing |
| Burning rate (mm/min) | | 20 | 31.5 | 50.4 | 23.8 |
| Burning extent (mm) | | 30 | 26.3 | 40.3 | 27.3 |
| Smoke test | | | | | |
| Smoke coefficient $C_{Smax}$ (m$^{-1}$) | 0.55 | 0.62 | 0.68 | 0.70 | 0.65 |
| Physical properties | | | | | |
| Density (g/cm$^3$) | 0.0765 | 0.0709 | 0.0688 | 0.0654 | 0.0638 |
| Tensile strength(g/cm$^2$) | 412 | 616 | 459 | 214 | 625 |
| Elongation (%) | 100 | 70 | 70 | 45 | 45 |
| Tear strength (g/cm) | 220 | 429 | 316 | 212 | 357 |
| Number of cells/25 mm | 85 | 55 | 65 | 55 | 75 |

Table 6-continued

|  | Example 7 | Example 8 | Example 9 | Example 10 | Example 11 |
|---|---|---|---|---|---|
| 25% ILD (kg/200 mmφ) | 10.8 | 26.4 | 20.4 | 21.0 | 18.0 |
| 65% ILD (kg/200 mmφ) | 43.2 | 74.4 | 55.8 | 78.6 | 49.8 |
| Compression set (%) (50% deflection, 70° C×22 hrs) | 34.0 | 38.2 | 42.2 | 44.6 | 31.6 |
| Resilience (%) | 47 | 24 | 21 | 25 | 19 |

Note:
*Trademark of poly(oxypropylene) triol made by Asahi Denka Co. Hydroxyl value: 510.
**Trademark of poly(oxypropylene) tetraol made by Asahi Denka Co. Hydroxyl value: 409.
***Trademark of poly(oxypropylene) octol made by Asahi Denka Co. Hydroxyl value: 550.
****Trademark of poly (oxypropylene) tetraol made by Asahi Denka Co. Hydroxyl value: 505.

EXAMPLES 12-16

Polyurethane foams were produced in the same manner as described in Example 1 according to the compounding recipe shown in the following Table 7 in order to examine the influence of the amount of catalyst and the kind of low molecular weight polyol. The flammability and smoke emission of the resulting foams are shown in Table 7 together with the compounding recipe and the foaming behavior.

As seen from Table 7, the polyurethane foams obtained by the compounding recipes shown in Table 7 are semi-rigid or rigid and excellent in the flame resistance. Moreover, the foaming and curing reactions proceed rapidly in these compounding recipes. Therefore, the foams are advantageously formed into a laminate or formed by the spray-foaming so as to use the foams as a heat insulator for various tanks.

Table 7

|  | Example 12 | Example 13 | Example 14 | Example 15 | Example 16 |
|---|---|---|---|---|---|
| Compounding recipe (g) | | | | | |
| Actcol 32-160 | 423 | 423 | 423 | 423 | 423 |
| Diethanolamine carbamate | 77 | 77 | 77 | 77 | 77 |
| G-300 | | 77 | | | |
| T-400 | | | 77 | | |
| SC-800 | | | | 77 | |
| EDP-450 | | | | | 77 |
| Stannous octoate | 5.0 | 5.0 | 5.0 | 5.0 | 2.5 |
| Silicone surfactant (L-520) | 0.5 | 0.5 | 0.5 | 0.5 | 0.5 |
| TDI-80 | 228.5 | 271 | 259 | 276 | 270 |
| (NCO index) | 100 | 100 | 100 | 100 | 100 |
| Foaming behavior | | | | | |
| Creame time (seconds) | 9 | 10 | 10 | 11 | 4 |
| Rise time (seconds) | 21 | 13 | 14 | 28 | 10 |
| Burning test | | | | | |
| Judged | non-burn | non-burn | non-burn | non-burn | non-burn |
| Smoke test | | | | | |
| Smoke coefficient $C_{Smax}$ (m$^{-1}$) | 0.66 | 0.71 | 0.75 | 0.78 | 0.77 |

EXAMPLES 17 and 18

Polyurethane foams were produced in the same manner as described in Example 1 according to the compounding recipe shown in the following Table 7 by the use of a blend of 90 parts of Actcol 32-160 and 10 parts of GP-3000as a polyol. The resulting foams were flame-resistant flexible or semi-rigid polyurethane foams having a low resilience and a high shock absorbing property.

In the measurement of the compression set under 75% deflection of the foams, when the set plate was removed and the foams were left to stand for 20 hours, both the values, 21.6% and 15.6%, of the compression set of the foams were decreased to less than 5%. This shows that the resulting flame-resistant foams have a characteristic property in the recovery.

Table 8

|  | Example 17 | Example 18 |
|---|---|---|
| Compounding recipe (g) | | |
| Actcol 32-160 | 450 | 450 |
| GP-3000 | 50 | 50 |
| Diethanolamine carbamate | 77 | 77 |
| Stannous octoate | 1.5 | 1.5 |
| Silicone surfactant (SH-200, 50 cs) | 1.0 | 0.25 |
| Trichloromonofluoromethane | 50 | |
| TDI-80 | 226.5 | 226.5 |
| (NCO index) | 103 | 103 |
| Foaming behavior | | |
| Cream time (seconds) | 18 | 14 |
| rise time (seconds) | 48 | 45 |
| Burning test | | |
| Judged | self-extinguishing | self-extinguishing |
| Burning rate (mm/min) | 34 | 36 |
| Burning extent (mm) | 29 | 38 |
| Smoke test | | |
| Smoke coefficient $C_{Smax}$ (m$^{-1}$) | 0.76 | 0.74 |
| Physical properties | | |
| Density (g/cm$^3$) | 0.0452 | 0.0835 |
| Tensile strength (g/cm$^2$) | 704 | 1,448 |
| Elongation (%) | 115 | 50 |
| Tear strength (g/cm) | 397 | 799 |
| Number of cells/25 mm | 40 | 45 |
| 25% ILD (kg/200 mmφ) | 14.0 | 49.5 |
| 65% ILD (kg/200 mmφ) | 33.9 | 142.2 |
| Compression set (%) (50% deflection, 70° C×22 hrs) | 16.8 | 13.2 |
| Compression set (%) (75% deflection, 25° C×96 hrs) | 21.6 | 15.0 |
| Resilience (%) | 8 | 13 |

EXAMPLE 19

A mixture of 12.7 parts of monoethanolamine carbamate and 100 parts of Actcol 32-160 was prepared in the same manner as described in Example 1. To 564 g of the mixture were added 1.0 g of stannous octoate, 5.0 g of silicone surfactant SRX-253 (made by Toray Silicone Co.) and 50 g of trichloromonofluoromethane, and the resulting mixture was stirred and added with 205 g (NCO index: 90) of TDI-80 to effect a foaming reaction in the same manner as described in Example 1. After a cream time of 20 seconds and a rise time of 62 seconds, healthy bubbles were generated and a flexible polyurethane foam having a uniform cell structure was obtained. The resulting foam had a density of 0.0516 g/cm$^2$, was judged as non-burn by the burning test and showed a $C_{Smax}$ of 0.67 m$^{-1}$ in the smoke emission test.

COMPARATIVE EXAMPLE 1

Hexamethylenediamine carbamate was prepared in the same manner as described in Example 1 by using hexamethylenediamine in place of diethanolamine, and a polyurethane foam was produced in the same manner as described in Example 1 by the use of the resulting hexamethylenediamine carbamate. However, in this case, the foaming reaction did not substantially proceed, and only a plate-shaped product was obtained.

COMPARATIVE EXAMPLES 2 and 3

When a system using an amine-carbamate of amine having no hydroxyl group is subjected to a foaming reaction without the use of water, the foaming reaction does not substantially proceed and no foam is obtained as illustrated in Comparative Example 1. Therefore, in these Comparative Examples 2 and 3, water was added to the system, and foaming reactions were carried out according to the compounding recipe shown in the following Table 9 in the same manner as described in Example 1 to prepare polyurethane foams. The flammability, smoke emission and physical properties of the resulting foams are shown in Table 9 together with the foaming behavior. It can be seen from Table 9 that the resulting foams are not flame-resistant and are inferior in the smoke resistance to the polyurethane foam of the present invention.

As seen from the above described Examples and Comparative Examples, flame- and smoke-resistant polyurethane foams can be obtained without the addition of flame retardant according to the method of the present invention.

Table 9

|  | Comparative Example 2 | Comparative Example 3 |
|---|---|---|
| Compounding recipe (g) | | |
| GP-3000 | 500 | 500 |
| Hexamethylenediamine carbamate | 34.5 | 13.8 |
| Water | 13.4 | 15.9 |
| Stannous octoate | 1.75 | 1.75 |
| N-ethylmorpholine | 1.0 | 1.0 |
| Triethylenediamine* | 5.0 | 5.0 |
| Silicone surfactant (L-520) | 5.0 | 5.0 |
| TDI-80 | 223 | 223 |
| (NCO index) | 100 | 100 |
| Foaming behavior | | |
| Cream time (seconds) | 13 | 12 |
| Rise time (seconds) | 90 | 90 |
| Burning test | | |
| Judged | burn | burn |
| Smoke test | | |
| Smoke coefficient $C_{Smax}$ (m$^{-1}$) | 0.95 | 0.98 |
| Physical properties | | |
| Density (g/cm$^3$) | 0.0344 | 0.0302 |
| Tensile strength (g/cm$^2$) | 563 | 967 |
| Elongation (%) | 60 | 150 |
| Tear strength (g/cm) | 266 | 494 |
| Number of cells/25 mm | 50 | 45 |
| 25% ILD (kg/200 mm$\phi$) | 13.2 | 15.7 |
| 65% ILD (kg/200 mm$\phi$) | 31.3 | 33.2 |
| Compression set (%) (50% deflection, 70° C×22 hrs) | 23.3 | 4.3 |
| Resilience (%) | 51 | 22 |

*DABCO 33LV made by Houdry Process Corp.

What is claimed is:

1. A flame- and smoke-resistant polyurethane foam obtained by reacting a polyol, a polyisocyanate and 3-40 parts by weight, based on 100 parts by weight of the polyol, of an amine-carbamate of primary or secondary amine having alcoholic hydroxyl group in the presence of a catalyst and a surfactant.

2. The polyurethane foam of claim 1, wherein the polyol has a number average molecular weight of 200-6,000 and a hydroxyl value of 20-900 mgKOH/g.

3. The polyurethane foam of claim 1, wherein the polyol has a number average molecular weight of 1,000-6,000 and a hydroxyl value of 20-170 mgKOH/g.

4. The polyurethane foam of claim 1, wherein the polyol is at least one polyol selected from polyether polyols, polyester polyols and polyetherester polyols.

5. The polyurethane foam of claim 1, wherein the polyol is poly(oxyalkylene) polyol.

6. The polyurethane foam of claim 1, wherein the polyisocyanate is used in an isocyanate index of 70-130.

7. The polyurethane foam of claim 1, wherein the polyisocyanate is at least one polyisocyanate selected from tolylene diisocyanate, diphenylmethane diisocyanate, diphenyl diisocyanate, chlorophenyl-2,4-diisocyanate, p-phenylene diisocyanate, xylylene diisocyanate and polymethylene-polyphenyl isocyanate.

8. The polyurethane foam of claim 1, wherein the polyisocyanate is tolylene diisocyanate.

9. The polyurethane foam of claim 1, wherein the amine-carbamate of primary or secondary amine having an alcoholic hydroxyl group is an amine-carbamate of a monoamine having an alcoholic hydroxyl group.

10. The polyurethane foam of claim 1, wherein the amine having an alcoholic hydroxyl group is at least one member selected from monoethanolamine, monoisopropanolamine, mono-n-propanolamine, mono-n-butanolamine, diethanolamine, diisopropanolamine, and di-n-propanolamine.

11. The polyurethane foam of claim 1, wherein the amount of the amine-carbamate used is 5-30 parts by weight.

12. The polyurethane foam of claim 1, wherein the catalyst is at least one compound selected from stannous octoate and dibutyltin dilaurate.

13. The polyurethane foam of claim 1, wherein the surfactant is at least one silicone surfactant selected from polydialkylsiloxanes and polysiloxane-polyalkylene oxide block copolymers.

14. A flame- and smoke-resistant polyurethane foam obtained by reacting (a) poly(oxypropylene) triol, (b) tolylene diisocyanate used in an isocyanate index of 95-110, and (c) an amine-carbamate of an amine having an alcoholic hydroxyl group, the amount of the amine-carbamate (c) being 10-30 parts by weight based on 100 parts by weight of poly(oxypropylene) triol (a), in the presence of a catalyst and a surfactant.

15. A method for producing flame- and smoke-resistant polyurethane foams, which comprises dissolving a primary or secondary amine having alcoholic hydroxyl group in a polyol, blowing carbon dioxide gas into the solution to form an amine-carbamate, and reacting the resulting mixture of the polyol and the amine-carbamate with a polyisocyanate in the presence of a catalyst and a surfactant.

16. The polyurethane foam of claim 1, wherein the amine-carbamate functions as a blowing agent.

17. The polyurethane foam of claim 14, wherein the amine-carbamate functions as a blowing agent.

18. The method of claim 15, wherein the amine-carbamate functions as a blowing agent.

19. The polyurethane foam of claim 1, wherein the polyurethane foam is obtained by reacting a system consisting essentially of the polyol, the polyisocyanate, the amine-carbamate, the catalyst and the surfactant.

20. The polyurethane foam of claim 14, wherein the polyurethane foam is obtained by reacting a system consisting essentially of components (a), (b), (c), the catalyst and the surfactant.

21. The method of claim 15, wherein the resulting mixture consists essentially of the polyol, the amine-carbamate, the polyisocyanate, the catalyst and the surfactant.

22. The polyurethane foam of claim 1, wherein the amine-carbamate is obtained by blowing carbon dioxide gas at room temperature into a previously prepared solution of the amine in the polyol.

23. The polyurethane foam of claim 14, wherein the amine-carbamate is obtained by blowing carbon dioxide gas at room temperature into a previously prepared solution of the amine in the polyol.

24. The method of claim 15, wherein the blowing of the carbon dioxide gas is at room temperature.

25. The polyurethane foam of claim 1, wherein during said reacting the amine-carbamate is decomposed due to the reaction of the hydroxyl group thereof with isocyanate groups on the polyisocyanate, whereafter foaming and curing reactions proceed.

26. The polyurethane foam of claim 14, wherein during said reacting the amine-carbamate is decomposed due to the reaction of the hydroxyl group thereof with isocyanate groups on the polyisocyanate, whereafter foaming and curing reactions proceed.

27. The method of claim 15, wherein during said reacting the amine-carbamate is decomposed due to the reaction of the hydroxyl group thereof with isocyanate groups on the polyisocyanate, whereafter foaming and curing reactions proceed.

28. The polyurethane foam of claim 9, wherein said amine is a monoamine.

29. The polyurethane foam of claim 14, wherein said amine having an alcoholic hydroxyl group is a primary or secondary amine.

30. The polyurethane foam of claim 29, wherein said amine is a monoamine.

31. The method of claim 15, wherein said amine is a monoamine.

* * * * *